(12) United States Patent
Nakamoto

(10) Patent No.: US 12,453,195 B2
(45) Date of Patent: Oct. 21, 2025

(54) SOLID-STATE IMAGING DEVICE

(71) Applicant: SONY SEMICONDUCTOR SOLUTIONS CORPORATION, Kanagawa (JP)

(72) Inventor: Yuta Nakamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 32 days.

(21) Appl. No.: 18/570,713

(22) PCT Filed: Mar. 11, 2022

(86) PCT No.: PCT/JP2022/010866
§ 371 (c)(1),
(2) Date: Dec. 15, 2023

(87) PCT Pub. No.: WO2022/270039
PCT Pub. Date: Dec. 29, 2022

(65) Prior Publication Data
US 2024/0290816 A1    Aug. 29, 2024

(30) Foreign Application Priority Data
Jun. 24, 2021 (JP) ................. 2021-105089

(51) Int. Cl.
*H10F 39/18* (2025.01)
*H04N 25/618* (2023.01)
(Continued)

(52) U.S. Cl.
CPC ........... *H10F 39/18* (2025.01); *H04N 25/618* (2023.01); *H04N 25/771* (2023.01); *H10F 39/802* (2025.01); *H10F 39/8037* (2025.01)

(58) Field of Classification Search
CPC .... H10F 39/18; H10F 39/802; H10F 39/8037; H10F 39/014; H10F 39/199;
(Continued)

(56) References Cited

U.S. PATENT DOCUMENTS

2015/0228684 A1* 8/2015 Yamashita ............ H10F 39/812
                                                            257/292
2016/0043120 A1   2/2016 Ahn et al.
(Continued)

FOREIGN PATENT DOCUMENTS

JP   2006-121093 A   5/2006
JP   2013-069846 A   4/2013
(Continued)

OTHER PUBLICATIONS

International Search Report and Written Opinion of PCT Application No. PCT/JP2022/010866, issued on May 31, 2022, 10 pages of ISRWO.

*Primary Examiner* — Albert H Cutler
(74) *Attorney, Agent, or Firm* — CHIP LAW GROUP

(57) ABSTRACT

Noise is reduced. A solid-state imaging device includes a photoelectric conversion unit that generates charge corresponding to an amount of received light, a transfer unit that transfers the charge generated by the photoelectric conversion unit, a charge storage unit that stores the charge transferred by the transfer unit, an amplifying transistor that amplifies a signal corresponding to the charge stored in the charge storage unit, and an isolation portion that isolates the photoelectric conversion unit, the amplifying transistor has a gate electrode including two vertical gate electrode portions provided in a depth-wise direction from a first surface of a semiconductor layer to sandwich a channel region therebetween, the isolation portion includes at least a first isolation portion provided in a first groove provided in the depth-wise direction from the first surface, and an insulating (Continued)

layer provided on a side of one of the two vertical gate electrode portions opposite to the channel region is provided to overlap at least a part of the first isolation portion when viewed in the depth-wise direction.

14 Claims, 13 Drawing Sheets

(51) Int. Cl.
*H04N 25/771* (2023.01)
*H10F 39/00* (2025.01)

(58) Field of Classification Search
CPC .. H10F 39/807; H10F 39/12; H10F 39/80373; H10F 39/813; H04N 25/618; H04N 25/771

See application file for complete search history.

(56) References Cited

U.S. PATENT DOCUMENTS

| | | | |
|---|---|---|---|
| 2016/0118432 A1 | 4/2016 | Cazaux et al. | |
| 2017/0200759 A1* | 7/2017 | Ihara | H10F 39/807 |
| 2021/0210534 A1* | 7/2021 | Chen | H10D 64/513 |
| 2022/0375977 A1* | 11/2022 | Zang | H10F 39/80373 |
| 2022/0376069 A1* | 11/2022 | Zang | H10D 30/668 |

FOREIGN PATENT DOCUMENTS

| | | |
|---|---|---|
| JP | 2014-096490 A | 5/2014 |
| JP | 2016-039315 A | 3/2016 |
| JP | 2017-168566 A | 9/2017 |
| JP | 2017-183636 A | 10/2017 |
| WO | 2013/094430 A1 | 6/2013 |
| WO | 2021/010024 A1 | 1/2021 |

* cited by examiner

SOLID-STATE IMAGING DEVICE

CROSS REFERENCE TO RELATED APPLICATIONS

This application is a U.S. National Phase of International Patent Application No. PCT/JP2022/010866 filed on Mar. 11, 2022, which claims priority benefit of Japanese Patent Application No. JP 2021-105089 filed in the Japan Patent Office on Jun. 24, 2021. Each of the above-referenced applications is hereby incorporated herein by reference in its entirety.

TECHNICAL FIELD

Embodiments according to the present disclosure relate to solid-state imaging devices.

BACKGROUND ART

Among solid state imaging devices, in a CMOS (Complementary Metal Oxide Semiconductor) image sensor in which a pixel driving circuit is provided for each pixel, charge obtained by conversion in the photoelectric conversion unit of each pixel is amplified by an amplifying transistor (Source Follower) provided in the pixel driving circuit, and the amplified charge is output to a vertical signal line by switching operation (see PTL 1).

CITATION LIST

Patent Literature

[PTL 1]
WO 2013/094430

SUMMARY

Technical Problem

However, as pixels in CMOS image sensors have been miniaturized, pixel transistors have also become finer, which is more likely to cause noise such as RTS (Random Telegraph Signal) noise.

Therefore, an object of the present disclosure is to provide a solid-state imaging device that allows noise to be reduced.

Solution to Problem

In order to solve the problem, a solid-state imaging device provided according to the present disclosure includes
a photoelectric conversion unit that generates charge corresponding to an amount of received light,
a transfer unit that transfers the charge generated by the photoelectric conversion unit,
a charge storage unit that stores the charge transferred by the transfer unit,
an amplifying transistor that amplifies a signal corresponding to the charge stored in the charge storage unit, and
an isolation portion that isolates the photoelectric conversion unit,
wherein
the amplifying transistor has a gate electrode including two vertical gate electrode portions provided in a depth-wise direction from a first surface of a semiconductor layer to sandwich a channel region therebetween,
the isolation portion includes at least a first isolation portion provided in a first groove provided in the depth-wise direction from the first surface, and
an insulating layer provided on a side of one of the two vertical gate electrode portions opposite to the channel region is provided to overlap at least a part of the first isolation portion when viewed in the depth-wise direction.

The first groove may penetrate the semiconductor layer from the first surface to a second surface opposite the first surface.

The insulating layer may be provided closer to the first surface in the first groove.

An impurity layer provided to cover the first isolation portion and having a conductivity type opposite to the conductivity type of the photoelectric conversion unit may be formed through the first groove.

An impurity layer provided to cover the first isolation portion and having a conductivity type opposite to the conductivity type of the photoelectric conversion unit may be formed by solid phase diffusion or plasma doping.

The channel region may have a fin shape.

The isolation portion may further include a second isolation portion provided in a second groove for a prescribed depth from a second surface on a side opposite to the first surface.

The gate electrode of the amplifying transistor is arranged not to overlap the second isolation portion when viewed in the depth-wise direction.

The gate electrode of the amplifying transistor may be shared by a plurality of the photoelectric conversion units and provided in a pixel region including the photoelectric conversion unit that photoelectrically converts blue wavelength light.

The second isolation portion may be provided at least a prescribed distance apart from the two vertical gate electrode portions when viewed in the depth-wise direction.

The isolation portion including the first and second isolation portions may be provided to surround an outer periphery of the photoelectric conversion unit in a substantially rectangular shape when viewed in the depth-wise direction, a first side of the substantially rectangular shape that overlaps the insulating layer when viewed in the depth-wise direction may be the first isolation portion, and of second and third sides of the substantially rectangular shape that are in contact with the first side when viewed in the depth-wise direction, the side closer to the first side may be the first isolation portion.

The charge storage unit may be provided to overlap the second isolation portion when viewed in the depth-wise direction and shared by a plurality of the photoelectric conversion units.

The first isolation portion may be provided to surround an outer periphery of the photoelectric conversion unit when viewed in the depth-wise direction.

The photoelectric conversion unit may be provided in the semiconductor layer, the gate electrode of the amplifying transistor may be provided to overlap at least a part of the photoelectric conversion unit when viewed in the depth-wise direction, and
the transfer unit may include a vertical transfer gate provided in the depth-wise direction between the photoelectric conversion unit and the first surface.

DESCRIPTION OF EMBODIMENTS

Figure 1:
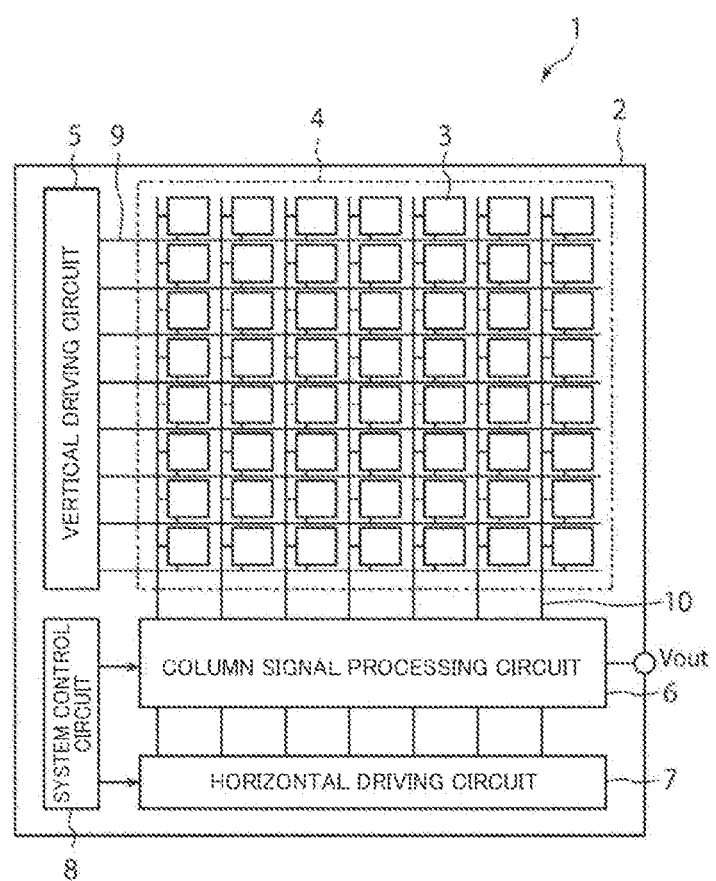
FIG. 1 is a schematic diagram of an exemplary solid-state imaging device to which the present technology is applied.

Hereinafter, solid-state imaging devices according to embodiments will be described with reference to the drawings. While essential parts of the solid-state imaging devices will be described, each of the solid-state imaging devices may include components and functions that are not included in the drawings or the following description. The following description is not intended to exclude any of those components and functions that are not illustrated or described.

<<Exemplary Schematic Configuration of Solid-State Imaging Devices According to Embodiments>>

FIG. 1 shows a schematic configuration of a solid-state imaging device that is a MOS solid-state imaging device by way of illustration.

The illustrated solid-state imaging device 1 has a pixel area 4 in which a plurality of pixels 3 including photoelectric conversion units are arranged two-dimensionally on one surface of a support substrate 2. The pixels 3 arranged in the pixel area 4 each include a pixel circuit including a photoelectric conversion unit, a floating diffusion, a readout gate, and a plurality of other transistors (so-called MOS transistors), as will be described below. In addition, a part of the pixel circuit is shared between a plurality of pixels 3 in some cases.

In the periphery of the pixel area 4 as described above, peripheral circuits such as a vertical driving circuit 5, a column signal processing circuit 6, a horizontal driving circuit 7, and a system control circuit 8 are provided.

The vertical driving circuit 5 includes for example a shift register and selects a pixel driving line 9, supplies a pulse to drive pixels 3 to the selected pixel driving line 9 and drives the pixels 3 arranged in the pixel area 4 on a row basis. In other words, the vertical driving circuit 5 selectively scans pixels arranged in the pixel area 4 in the vertical direction sequentially on a row basis. Then, a pixel signal based on signal charge generated in each of the pixels 3 according to the amount of light received is supplied to the column signal processing circuit 6 through a vertical signal line 10 provided perpendicularly to the pixel driving line 9.

The column signal processing circuit 6 is arranged for example for each column of pixels and performs signal processing such as noise removal to signals output from pixels 3 for one column on a column basis. In other words, the column signal processing circuit 6 performs signal processing such as correlated double sampling (CDS) to remove pixel-specific fixed pattern noise, signal amplification, and analog/digital (AD) conversion.

The horizontal driving circuit 7 includes for example a shift register, selects each of the column signal processing circuits 6 sequentially by sequentially outputting a horizontal scanning pulse, and causes a pixel signal to be output from each of the column signal processing circuits 6.

The system control circuit 8 receives for example an input clock signal and data for commanding an operation mode and outputs data such as internal information about the solid-state imaging device 1. In other words, the system control circuit 8 generates clock signals and control signals that serve as references for the operation of the vertical driving circuit 5, the column signal processing circuits 6, and the horizontal driving circuit 7 on the basis of a vertical synchronous signal, a horizontal synchronous signal, and a master clock signal. These signals are then input for example to the vertical driving circuit 5, the column signal processing circuits 6, and the horizontal driving circuit 7.

The above-described peripheral circuits 5 to 8 and the pixel circuits in the pixel area 4 constitute a driving circuit that drives the pixels. The peripheral circuits 5 to 8 may be arranged in a position where these circuits are stacked in the pixel area 4.

Figure 2:
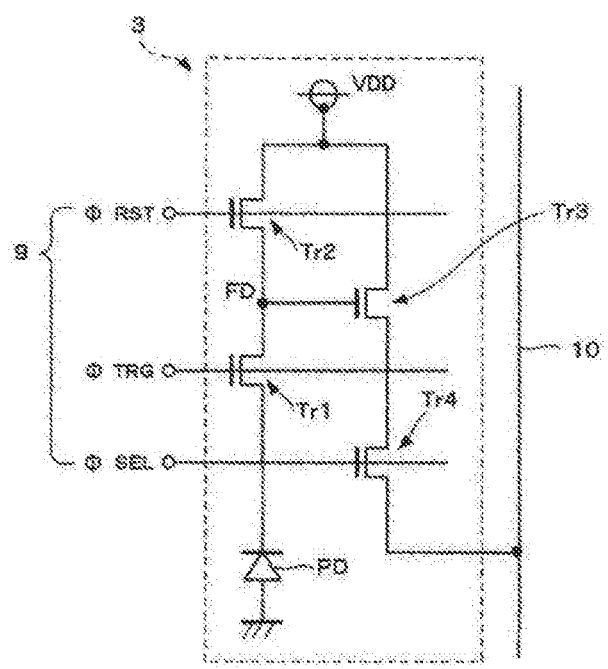
FIG. 2 is a schematic diagram of an exemplary pixel driving circuit in a solid-state imaging device to which the present technology is applied.

FIG. 2 is an equivalent circuit diagram of a pixel circuit provided for each pixel 3. The pixels 3 in this example each include a photodiode PD that forms a photoelectric conversion unit and four pixel transistors. The four pixel transistors are a transfer transistor Tr1, a reset transistor Tr2, an amplifying transistor Tr3, and a selection transistor Tr4. Here, n-channel MOS transistors for example are used as the pixel transistors Tr1 to Tr4.

The photodiode PD is connected to the transfer transistor Tr1 (transfer unit). The transfer transistor Tr1 is connected to the reset transistor Tr2 via a floating diffusion FD. The signal charge (electrons in this example) photoelectrically converted by the photodiode PD and stored therein is transferred to the floating diffusion FD as a transfer pulse φTRG is applied to the gate (transfer gate) of the transfer transistor Tr1. The transfer pulse φTRG is applied from one of the pixel driving lines 9.

The floating diffusion FD is connected to the gate of the amplifying transistor Tr3. The amplifying transistor Tr3 and the reset transistor Tr2 have their drains connected with a power supply VDD. Here, the source of the reset transistor Tr2 (the drain of the transfer transistor Tr1) is configured as the floating diffusion FD. Before the transfer of the signal charge from the photodiode PD to the floating diffusion FD, the potential of the floating diffusion FD is reset by a reset pulse φRST applied to the reset gate. The reset pulse φRST is applied from one of the pixel driving lines 9.

The amplifying transistor Tr3 has its source connected to the drain of the selection transistor Tr4, and the selection transistor has its source connected to a vertical signal line 10. The selection transistor Tr4 is turned on in response to a selection pulse φSEL applied to its gate, so that the pixel 3 is selected. The selection pulse φSEL is applied from one of the pixel driving lines 9. The amplifying transistor Tr3 outputs the potential of the floating diffusion FD which has been reset by the reset transistor Tr2 as a reset level to the vertical signal line 10 via the selection transistor Tr4. The amplifying transistor Tr3 outputs, as a signal level, the potential of the floating diffusion FD after the transfer of the signal charge by the transfer transistor Tr1 to the vertical signal line 10 via the selection transistor Tr4. The selection transistor Tr4 may be connected between the power supply VDD and the drain of the amplifying transistor Tr3. In this case, the amplifying transistor Tr3 has its source connected to the vertical signal line 10.

First Embodiment

<Configuration of Solid-State Imaging Device>

Figure 3:
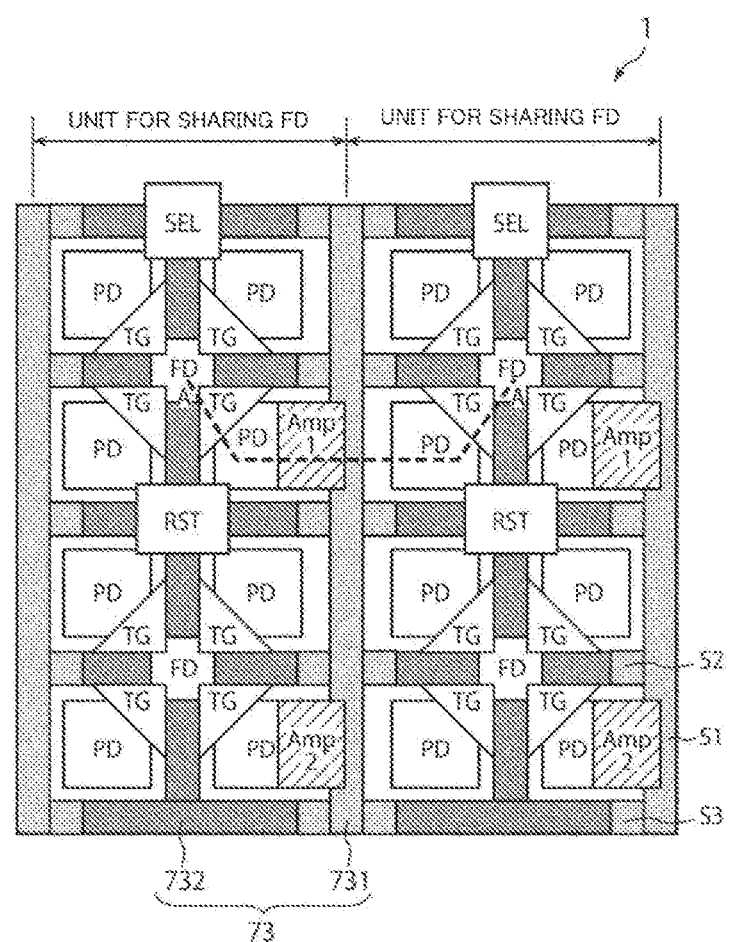
FIG. 3 is a schematic plan view of an essential part of an exemplary configuration of a solid-state imaging device according to a first embodiment.
Figure 4:
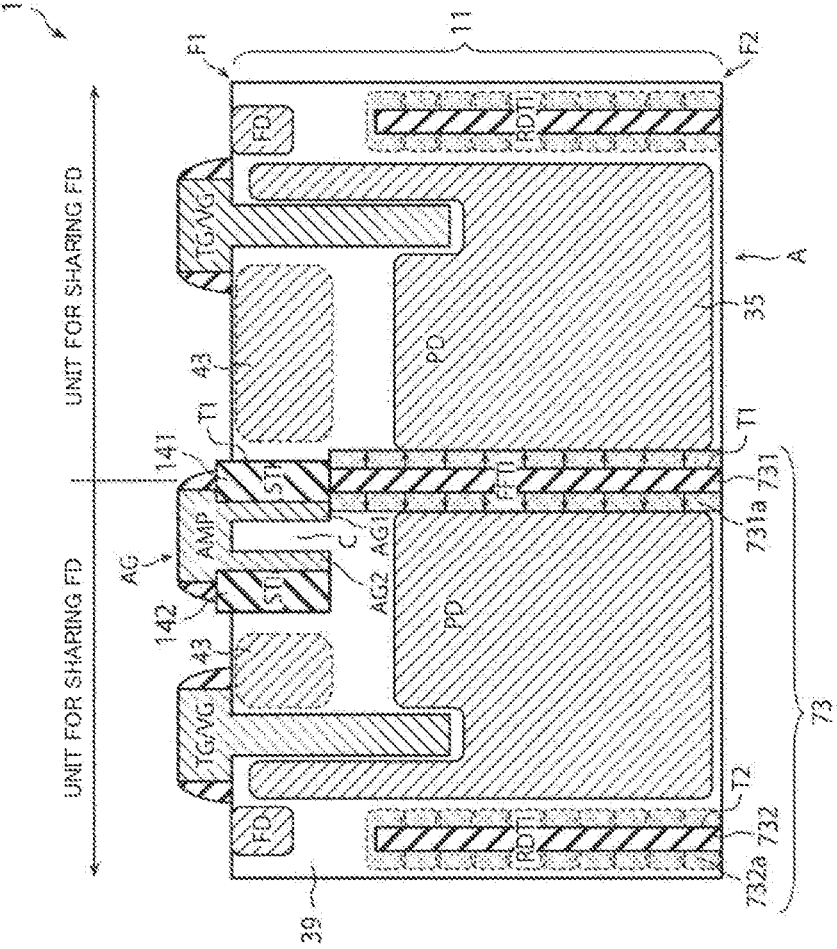
FIG. 4 is a cross-sectional view of an essential part of an exemplary configuration of a solid-state imaging device according to the first embodiment.

FIG. 3 is a schematic plan view of an essential part of an exemplary configuration of a solid-state imaging device 1 according to the first embodiment, and FIG. 4 is a cross-sectional view of an essential part taken along A-A in FIG. 3. FIGS. 3 and 4 correspond to the part from the photodiode PD to the floating diffusion FD in FIG. 2, the reset transistor Tr2 (RST in FIG. 3), the amplifying transistor Tr3 (Amp1 and Amp2 in FIG. 3), and the selection transistor Tr4 (SEL in FIG. 3). Hereinafter, the configuration of the solid-state imaging device 1 according to the first embodiment will be described with reference to the drawings.

As shown in FIGS. 3 and 4, the solid-state imaging device 1 according to the first embodiment has a photodiode PD that constitutes a photoelectric conversion unit inside of a semiconductor layer 11. Gate electrodes including the transfer gate TG of the transfer transistor Tr1 and the amplifying gate AG of the amplifying transistor Tr3 are provided on a first surface F1 as one main surface (surface) of the semiconductor layer 11. A wiring layer having multiple layers placed on each other and insulated from each other with interlayer insulating films therebetween are provided on these gate electrodes.

Meanwhile, the side of a second surface F2 as the other main surface of the semiconductor layer 11 serves as a light-receiving surface A for the photodiode PD, and optical layers such as a color filter (not shown) and an on-chip lens 23 are arranged as required on the surface with a protective insulating film (not shown) therebetween. In this way, the solid-state imaging device 1 operates as a backside illumination type device with the other main surface on the opposite side to the wiring layer serving as the light-receiving surface A.

Various components will be described in detail in the order of the semiconductor layer 11, the photodiode PD that constitutes the photoelectric conversion unit, the floating diffusion FD, the transfer gate TG, and the amplifying transistor Tr3.

[Semiconductor Layer 11]

For example, the semiconductor layer 11 is made of intrinsic semiconductor such as single crystal silicon. The semiconductor layer 11 is for example a semiconductor layer as a semiconductor substrate.

[Photodiode (Photoelectric Conversion Unit) PD]

The photodiode PD which constitutes the photoelectric conversion unit that generates charge according to the amount of received light includes a pn junction formed between an n-type impurity region in the semiconductor layer 11 as a charge storage region 35 and a p-type impurity region in contact with the charge storage region 35.

As shown in FIG. 4, the photodiode PD is embedded in the semiconductor layer 11. In other words, the photodiode PD is not exposed on the first surface F1 of the semiconductor layer 11. As shown in FIG. 3, the four sides of the photodiode PD are isolated by an isolation portion 73.

[Floating Diffusion FD]

The floating diffusion FD is the part where charge stored in the charge storage region 35 of the photodiode PD is read out by the operation of the transfer gate TG. In other words, the floating diffusion FD stores charge transferred by the transfer gate TG. The floating diffusion FD is surrounded by a p-type well region 39 and faces the first surface F1. Here, the p-type well region 39 is provided in contact with the n-type charge storage region 35 that constitutes the photodiode PD. In this manner, the p-type well region 39 is provided between the floating diffusion FD and the n-type charge storage region 35.

The floating diffusion FD is shared by multiple photodiodes PD. As shown in FIG. 3, 2×2 photodiodes PD constitute one block, and a floating diffusion FD is provided for each block. In this manner, the photodiodes PD can have a larger area, and the saturated charge capacity Qs can be increased. The floating diffusion FD is provided for example in the center of the block. A transfer gate TG is located near the floating diffusion FD of each photodiode PD.

[Transfer Gate TG]

The transfer gate TG is a gate electrode for reading out charge stored in the charge storage region 35 of a photodiode PD to the floating diffusion FD. For example, the transfer gate TG is made of polysilicon.

In the example shown in FIG. 4, the transfer gate TG includes a vertical transfer gate VG which is provided in the depth-wise direction between the photodiode PD and the first surface F1.

Note that the depth-wise direction is the top-bottom direction of the sheet in FIG. 4 and also the normal direction to the first surface F1.

[Amplifying Transistor Tr3]

The amplifying transistor Tr3 amplifies a signal corresponding to charge stored in the floating diffusion FD. The amplifying transistor Tr3 is connected to the floating diffusion FD and is configured to serve as a fully depletion type transistor. The amplifying transistor Tr3 has a gate electrode (i.e., an amplifying gate AG). A p-type well region 43 of a p-type impurity region is provided on either side of the amplifying gate AG.

The amplifying gate AG of the amplifying transistor Tr3 is positioned to overlap at least a part of the photodiode PD when viewed in the depth-wise direction. In other words, the photodiode PD is embedded below the amplifying transistor Tr3 in the semiconductor layer 11 to avoid the amplifying transistor Tr3. This can increase the area of the photodiode PD, so that the saturated charge capacity Qs can be increased.

The amplifying gate AG includes two vertical gate electrode portions. More specifically, the amplifying gate AG includes a first vertical gate electrode portion AG1 and a second vertical gate electrode portion AG2. The first vertical gate electrode portion AG1 and the second vertical gate electrode portion AG2 are provided in the depth-wise direction from the first surface F1 of the semiconductor layer 11. The first vertical gate electrode portion AG1 and the second vertical gate electrode portion AG2 are provided in a direction parallel to the first surface F1 to sandwich the channel region C of the amplifying transistor Tr3 therebetween. The channel region C has for example a fin shape. More specifically, the first vertical gate electrode portion AG1, the second vertical gate electrode portion AG2, and the channel region C are provided to extend in the vertical direction of the sheet surface in FIG. 4. The amplifying transistor Tr3 is a fin-type MOSFET (MOS Field Effect Transistor) (hereinafter also referred to as a "FinFET"). The FinFET is highly resistant to impurity variations.

As pixels in CMOS image sensors has become finer, pixel transistors such as the amplifying transistor Tr3 have also become finer, and noise such as RTS noise has become more likely to occur. The RTS noise is attributable to impurity fluctuations in the channel region C. Therefore, the amplifying transistor Tr3 is preferably a fully depletion type, in other words, the channel region C of the amplifying transistor Tr3 is preferably an intrinsic semiconductor part. However, for example, an impurity doped in the semiconductor layer 11 may get into the channel region C of the amplifying transistor Tr3.

Therefore, in order to reduce noise such as RTS noise, the isolation portion 73 and the insulating layer 14 are configured as in the following description to suppress an impurity from entering the channel region C of the amplifying transistor Tr3. Providing the amplifying transistor Tr3 as the FinFET as described above leads to suppression of noise such as RTS noise.

[Isolation Portion]

The isolation portion 73 divides the photodiode PD. The isolation portion 73 includes a first isolation portion 731 and a second isolation portion 732.

In the isolation portion 73, the first isolation portion 731 is provided in a first groove (first trench) T1 provided in the depth-wise direction from the first surface F1. More specifically, the first groove T1 penetrates the semiconductor layer 11 from the first surface F1 to the second surface F2. The second surface F2 is a surface on the opposite side to the first surface F1. The first isolation portion 731 is for example a Front Full Trench Isolation (FFTI). The first isolation portion 731 is formed for example by filling the first groove T1 with an insulator. The material of the insulator of the first isolation portion 731 is for example $SiO_2$.

The second isolation portion 732 is provided within a second groove (second trench) T2 provided from the second surface F2 for a prescribed depth in the isolation portion 73. The second isolation portion 732 is for example a Reverse Deep Trench Isolation (RDTI). The second isolation portion 732 is formed for example by filling the second groove T2 with an insulator. The material of the insulator of the second isolation portion 732 is for example $SiO_2$.

The floating diffusion FD is positioned to overlap the second isolation portion 732 when viewed in the depth-wise direction. In other words, the floating diffusion FD is positioned between the first surface F1 and the second isolation portion 732.

Impurity layers 731a and 732a are provided around the first isolation portion 731 and the second isolation portion 732, respectively. The impurity layers 731a and 732a have the type of conductivity (e.g., p-type) opposite to that of the photodiode PD. The impurity layers 731a and 732a are provided to suppress the effect of dark current attributable to crystal defects caused by the formation of the first and second grooves T1 and T2, respectively. The impurity layer 731a arranged to cover the first isolation portion 731 is formed, though not limited to, for example by solid phase diffusion, as will be described later. The impurity layer 732a that covers the second isolation portion 732 is formed for example by ion implantation.

Here, in the ion implantation, an impurity (e.g., boron (B)) is introduced from the side of the first surface F1. In the ion implantation, an impurity can be introduced at any position using resist, and the impurity can be introduced to any depth by controlling the acceleration voltage. However, the impurity may also be slightly distributed above the second isolation portion 732, in other words, in the area between the first surface F1 and the second isolation portion 732. In other words, the impurity may be slightly doped to the side of the first surface F1.

Meanwhile, the impurity layer 731a can be formed by solid phase diffusion via the sidewall of the first groove T1 that opens on the first surface F1. Therefore, by solid phase diffusion, the impurity can be introduced to under the amplifying transistor Tr3 without using ion implantation.

Therefore, in order to suppress the introduction of the impurity into the channel region C of the amplifying transistor Tr3, the first isolation portion 731, rather than the second isolation portion 732, is preferably provided in the vicinity of the amplifying transistor Tr3.

[Insulating Layer]

An insulating layer (STI, Shallow Trench Isolation) 14 includes an insulating layer 141 and an insulating layer 142. The insulating layer 141 is provided adjacent to the side of the first vertical gate electrode portion AG1 opposite to the channel region C. The insulating layer 142 is provided adjacent to the side of the second vertical gate electrode portion AG2 opposite to the channel region C. The sidewall insulating layer of the amplifying gate AG is provided on the insulating layer 14.

The insulating layer 141 adjacent to the first vertical gate electrode portion AG1 is arranged to overlap at least a part of the first isolation portion 731 when viewed in the depth-wise direction. In other words, as shown in FIG. 3, the amplifying gate AG of the amplifying transistor Tr3 is arranged shifted to partly overlap the first isolation portion 731. In this case, in FIG. 4, the first isolation portion 731 and the insulating layer 141 are arranged to be aligned in the depth-wise direction. As shown in FIG. 4, the insulating layer 141 is provided on the side of the first surface F1 inside of the first groove T1.

When the second isolation portion 732 is arranged in close proximity to the amplifying transistor Tr3 as described above, an impurity may easily get into the channel region C of the amplifying transistor Tr3. Therefore, as shown in FIG. 3, the second isolation portion 732 is provided at least a prescribed distance apart from the first vertical gate electrode portion AG1 and the second vertical gate electrode portion AG2 when viewed in the depth-wise direction.

As shown in FIG. 3, the isolation portion 73 including the first isolation portion 731 and the second isolation portion 732 is arranged to surround the outer periphery of the photodiode PD in a substantially rectangular shape when viewed in the depth-wise direction. A part of the substantially rectangular shape that surrounds one photodiode PD is the first isolation portion 731, and the other part is the second isolation portion 732. A first side S1 of the substantially rectangular shape that overlaps the insulating layer 141 when viewed in the depth-wise direction is the first isolation portion 731. Of second and third sides S2 and S3 of the substantially rectangular shape that are in contact with the first side S1 when viewed in the depth-wise direction, the side closer to the first side S1 is the first isolation portion 731. In other words, among the second and third sides S2 and S3, the first isolation portion 731 is provided up to somewhere in the middle in the left-right direction of the sheet of FIG. 3. The first isolation portion 731 is arranged to protrude from the first side S1 toward the second side S2 and the third side S3. More particularly, for example, the first isolation portion 731 is arranged to protrude from the first side S1 at least for the distance between the first vertical gate electrode portion AG1 and the second vertical gate electrode portion AG2.

According to the first embodiment as described above, the insulating layer 141 is provided on the side of the first vertical gate electrode portion AG1 opposite to the channel region C and overlaps at least a part of the first isolation portion 731 when viewed in the depth-wise direction. This can suppress an impurity from entering the channel region C of the amplifying transistor Tr3. As a result, the amplifying transistor Tr3 can be more easily formed into a fully depletion type, and noise such as RTS noise can be suppressed.

As will be described later with reference to a second comparative example, in the example shown in FIG. 3, the amplifying transistor Tr3 is shared by multiple photodiodes PD and is arranged in the area of pixels 3 that include photodiodes PD that photoelectrically convert blue wavelength light.

As the width of the impurity layer 731a to cover the first isolation portion 731 increases, the impurity can more easily get into the channel region C of the amplifying transistor Tr3. Therefore, the impurity can be suppressed from getting into the channel region C of the amplifying transistor Tr3 by increasing the width of the insulating layer 141.

First Comparative Example

Figure 5:
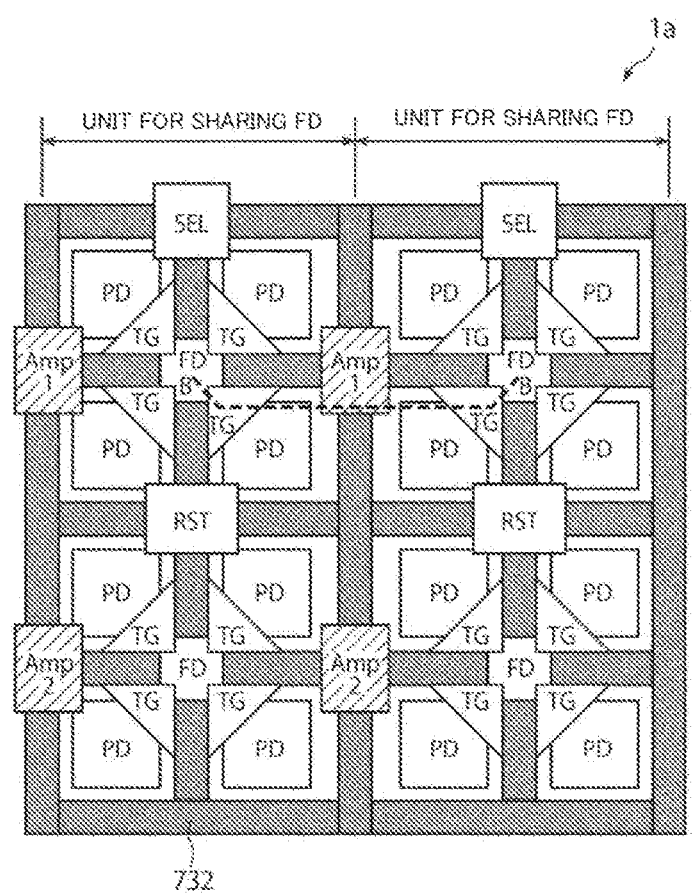
FIG. 5 is a schematic plan view of an essential part of an exemplary configuration of the solid-state imaging device according to a first comparative example.
Figure 6:
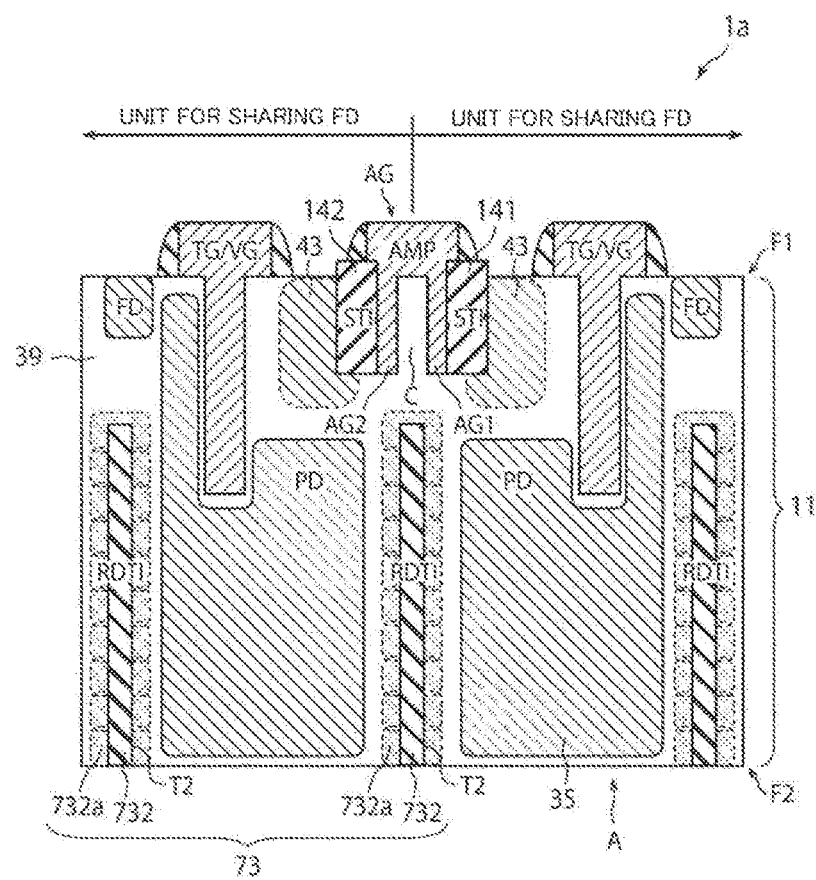
FIG. 6 is a cross-sectional view of an essential part of an exemplary configuration of the solid-state imaging device according to the first comparative example.

FIG. 5 is a schematic plan view of an essential part of an exemplary configuration of a solid-state imaging device 1a according to a first comparative example, and FIG. 6 is a cross-sectional view of an essential part taken along B-B in FIG. 5.

In the first comparative example, the isolation portion 73 is entirely made up of the second isolation portions 732. In addition, the amplifying transistor Tr3 is located at the position where the second isolation portions 732 crosses in FIG. 5.

As shown in FIGS. 5 and 6, the amplifying transistor Tr3 is provided above the second isolation portion 732. In ion implantation, there can be a small amount of impurity in the region between the second isolation portion 732 and the first surface F1. The impurity may get into the channel region C of the amplifying transistor Tr3. In other words, even if the amplifying transistor Tr3 is made as a FinFET, an impurity introduced in forming the impurity layer 732a of the second isolation portion 732 may get into the channel region C of the amplifying transistor Tr3. This may make it difficult to make the FinFET a fully depletion type and may also increase noise such as RTS noise.

In contrast, according to the first embodiment, the ion implantation to form the impurity layer 732a to cover the second isolation portion 732 is not performed at the position of the amplifying transistor Tr3. This allows noise such as RTS noise to be suppressed.

Second Comparative Example

Figure 7:
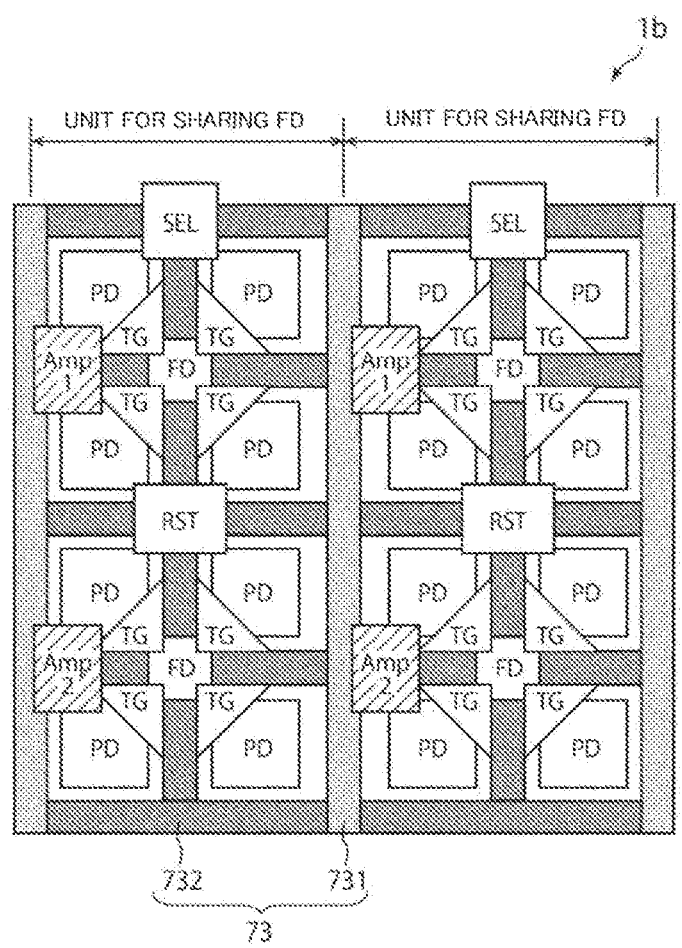
FIG. 7 is a schematic plan view of an essential part of an exemplary configuration of a solid-state imaging device according to a second comparative example.

FIG. 7 is a schematic plan view of an essential part of an exemplary configuration of a solid-state imaging device 1b according to the second comparative example.

Unlike the first comparative example, some of the second isolation portions 732 are replaced by the first isolation portions 731 according to the second comparative example. In the example shown in FIG. 7, the isolation portion 73 provided in the up-down direction of the sheet is the first isolation portion 731. In the second comparative example, the insulating layer 141 is arranged to overlap the first isolation portion 731 when viewed in the depth-wise direction similarly to the first embodiment.

As shown in FIG. 7, both the first isolation portion 731 and the second isolation portion 732 are arranged under the amplifying transistor Tr3. In other words, since the amplifying transistor Tr3 is placed in close proximity to the second isolation portion 732, an impurity for ion implantation may get into the channel region C of the amplifying transistor Tr3. In addition, light incident from the second surface F2 is reflected by the amplifying gate AG, resulting in a reflection component in the pixel signal. This reflection component can be incident angle dependent depending on whether the incident light is from the side of the first isolation portion 731 or the side of the second isolation portion 732. In this case, optical color mixing changes depending on the angle of incidence. For example, there can be a difference in how it looks between the center of the angle of view and the edge of the angle of view.

In contrast, according to the first embodiment, the ion implantation to form the impurity layer 732a to cover the second isolation portion 732 is not performed at a position near the amplifying transistor Tr3. This allows noise such as RTS noise to be suppressed. According to the first embodiment, the amplifying gate AG of the amplifying transistor Tr3 is located in the area of pixels 3 that includes the photodiodes PD that photoelectrically convert blue wavelength light. In this way, light incident on the pixel 3 is more likely to be absorbed by the photodiode PD before being reflected by the amplifying gate AG. As a result, the effect of reflection at the amplifying gate AG can be reduced, and changes depending on the angle of incidence in optical color mixing can be reduced.

The first embodiment can be applied not only to the amplifying transistor Tr3 but also to other transistors.

According to the first embodiment, instead of the insulating layer 141, the insulating layer 142 adjacent to the second vertical gate electrode portion AG2 may be arranged to overlap the first isolation portion 731 when viewed in the depth-wise direction. In other words, the insulating layer 14 adjacent to one of the two vertical gate electrode portions is arranged to overlap at least a part of the first isolation portion 731 when viewed in the depth-wise direction.

In the example shown in FIG. 4, the insulating layer 141 and the first isolation portion 731 are in direct contact with each other but may be arranged apart from each other. For example, a liner film may be provided between the insulating layer 141 and the first isolation portion 731 to cover the insulating layer 141. For example, the material of the liner film is SiN.

According to the first embodiment, the impurity layer 731a arranged to cover the first isolation portion 731 may be provided by plasma doping rather than solid phase diffusion. The impurity layer 731a is formed for example by a method that allows conformal doping on the sidewall of the first groove T1. In other words, the impurity layer 731a is formed through the first groove T1 from the side of the first surface F1. The impurity layer 731a can be formed by any method that makes it difficult for an impurity to get into the channel region C of the amplifying transistor Tr3.

Second Embodiment

Figure 8:
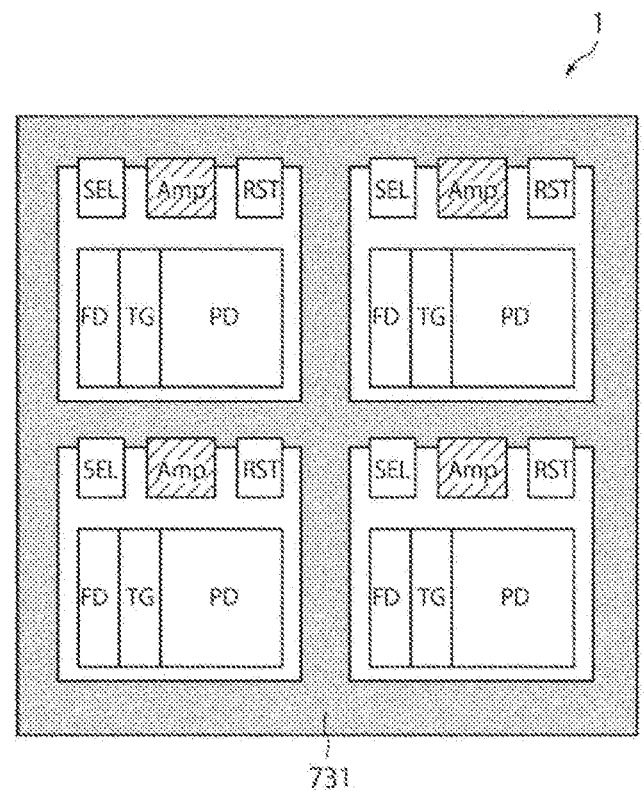
FIG. 8 is a schematic plan view of an essential part of an exemplary configuration of a solid-state imaging device according to a second embodiment.

FIG. 8 is a schematic plan view of an essential part of an exemplary configuration of a solid-state imaging device 1 according to a second embodiment. The second embodiment is different from the first embodiment in that the isolation portion 73 is entirely made up of the first isolation portion 731.

As shown in FIG. 8, the first isolation portion 731 is arranged to surround the outer periphery of the photodiodes when viewed in the depth-wise direction. Since the second isolation portion 732 is not provided, the floating diffusion FD cannot be shared by multiple photodiodes PD (pixels 3). Therefore, the floating diffusion FD is arranged for each pixel 3.

According to the second embodiment, the isolation portion 73 may be entirely made up of the first isolation portion 731. Also in this case, the same advantageous effects as those of the first embodiment can be provided.

Third Embodiment

Figure 9:
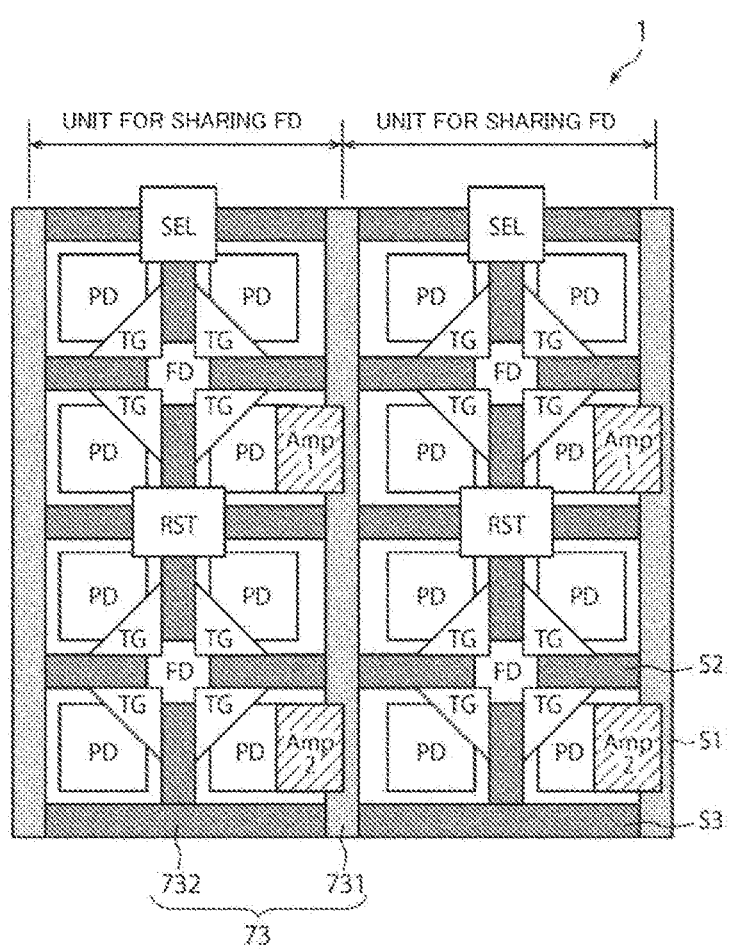
FIG. 9 is a schematic plan view of an essential part of an exemplary configuration of a solid-state imaging device according to a third embodiment.

FIG. 9 is a schematic plan view of an essential part of an exemplary configuration of a solid-state imaging device 1 according to a third embodiment. The third embodiment is different from the first embodiment in that the first isolation portion 731 and the second isolation portion 732 are arranged in a different layout pattern.

As shown in FIG. 9, all the second sides S2 and the third sides S3 are made up of the second isolation portions 732. Unlike the first embodiment, the amplifying transistor Tr3 is provided in close proximity to the second isolation portions 732, which may result in reduced suppression of noise such as RTS noise. However, as compared to the first embodiment, the layout pattern is simpler, and it is easier to form the pattern of the isolation portion 73.

As in the third embodiment, the layout pattern of the first isolation portion 731 and the second isolation portion 732 may be changed. Also in this case, the same advantageous effects as those of the first embodiment can be obtained.

<Application to Endoscopic Surgery System>

The technology according to the present disclosure (the present technology) can be applied to various products. For example, the technique according to the present disclosure may be applied to an endoscopic surgery system.

Figure 10:
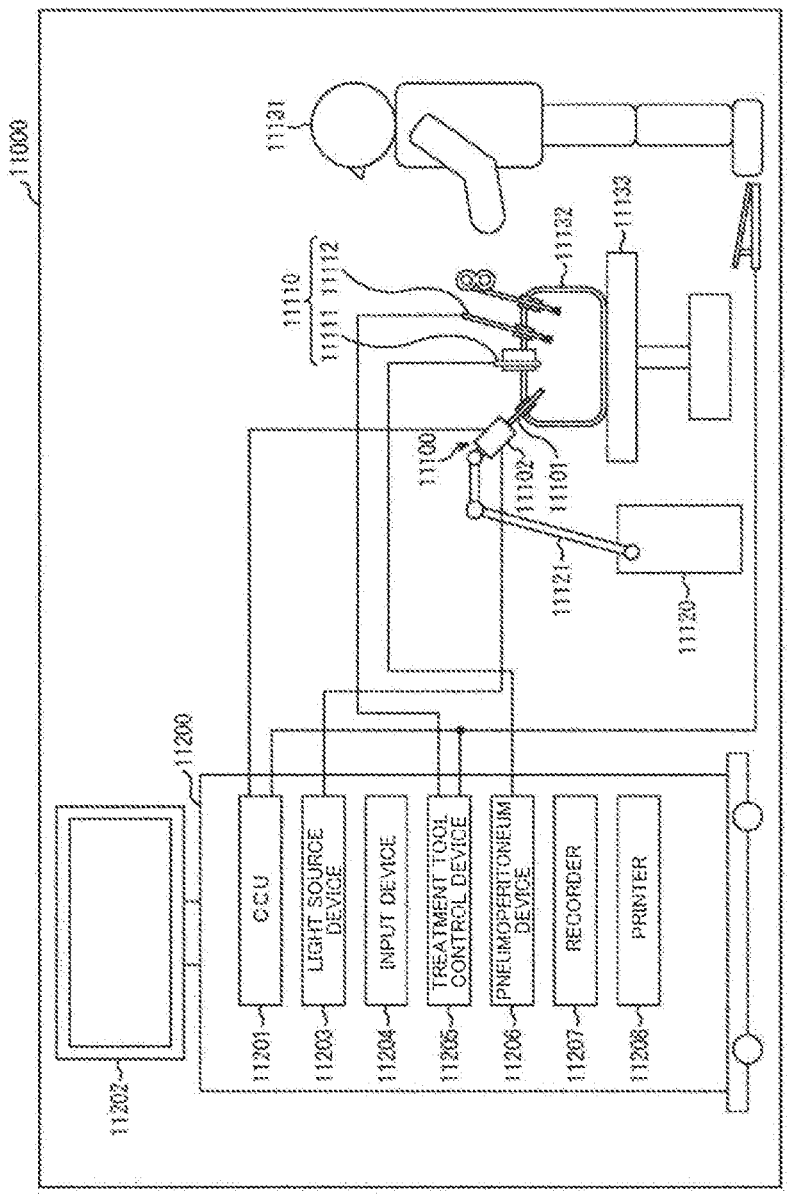
FIG. 10 illustrates an example of a schematic configuration of an endoscopic surgical system.

FIG. 10 is a diagram illustrating an example of a schematic configuration of an endoscope surgery system to which the technology according to the present disclosure (the present technology) is applied.

FIG. 10 shows a state where an operator (doctor) 11131 is using an endoscopic surgery system 11000 to perform a surgical operation on a patient 11132 on a patient bed 11133. As illustrated, the endoscopic surgery system 11000 is constituted of an endoscope 11100, another surgical instrument 11110 such as a pneumoperitoneum tube 11111 or an energized treatment tool 11112, a support arm device 11120 that supports the endoscope 11100, and a cart 11200 mounted with various devices for endoscopic surgery.

The endoscope 11100 includes a lens barrel 11101 of which a region having a predetermined length from a tip thereof is inserted into a body cavity of the patient 11132, and a camera head 11102 connected to a base end of the lens barrel 11101. In the illustrated example, the endoscope 11100 configured as a so-called rigid endoscope having the rigid lens barrel 11101 is illustrated, but the endoscope 11100 may be configured as a so-called flexible endoscope having a flexible lens barrel.

The distal end of the lens barrel 11101 is provided with an opening into which an objective lens is fitted. A light source device 11203 is connected to the endoscope 11100, light generated by the light source device 11203 is guided to the distal end of the lens barrel 11101 by a light guide extended to the inside of the lens barrel 11101, and the light is radiated toward an observation target in the body cavity of the patient 11132 through the objective lens. The endoscope 11100 may be a direct-viewing endoscope, an oblique-viewing endoscope, or a side-viewing endoscope.

An optical system and an imaging element are provided inside of the camera head 11102, and reflected light (observation light) from the observation target is condensed onto the imaging element by the optical system. The imaging element photoelectrically converts the observation light to generate an electric signal corresponding to the observation light, that is, an image signal corresponding to an observation image. The image signal is transmitted to a camera control unit (CCU) 11201 as RAW data.

The CCU 11201 includes a central processing unit (CPU), a graphics processing unit (GPU), or the like, and comprehensively controls the operations of the endoscope 11100 and a display device 11202. The CCU 11201 receives an image signal from the camera head 11102 and performs various types of image processing such as development processing (demosaicing) on the image signal to display an image based on the image signal.

The display device 11202 displays the image based on the image signal subjected to the image processing by the CCU 11201 under the control of the CCU 11201.

The light source device 11203 includes a light source such as a light emitting diode (LED) and supplies the endoscope 11100 with irradiation light for imaging a surgical site or the like.

An input device 11204 is an input interface for the endoscopic surgery system 11000. The user can input various types of information or instructions to the endoscopic surgery system 11000 via the input device 11204. For example, the user inputs an instruction to change imaging conditions (a type of radiation light, a magnification, a focal length, or the like) of the endoscope 11100.

A treatment tool control device 11205 controls driving of the energized treatment tool 11112 for cauterization or incision of a tissue, sealing of blood vessel, or the like. A pneumoperitoneum device 11206 sends a gas into the body cavity of the patient 11132 via the pneumoperitoneum tube 11111 in order to inflate the body cavity for the purpose of securing a field of view using the endoscope 11100 and a working space of the operator. A recorder 11207 is a device capable of recording various types of information on surgery. A printer 11208 is a device capable of printing various types of information on surgery in various formats such as text, images, and graphs.

The light source device 11203 that supplies the endoscope 11100 with the radiation light for imaging the surgical site can be configured of, for example, an LED, a laser light source, or a white light source configured of a combination thereof. When a white light source is formed by a combination of RGB laser light sources, it is possible to control an output intensity and an output timing of each color (each wavelength) with high accuracy, and thus the light source device 11203 can adjust white balance of the captured image. Further, in this case, laser light from each of the respective RGB laser light sources is radiated to the observation target in a time division manner, and driving of the imaging element of the camera head 11102 is controlled in synchronization with radiation timing such that images corresponding to respective RGB can be captured in a time division manner. According to this method, it is possible to obtain a color image without providing a color filter in the imaging element.

Further, driving of the light source device 11203 may be controlled so that an intensity of output light is changed at predetermined time intervals. The driving of the imaging element of the camera head 11102 is controlled in synchronization with a timing of changing the intensity of the light, and images are acquired in a time division manner and combined, such that an image having a high dynamic range without so-called blackout and whiteout can be generated.

The light source device 11203 may be configured to be able to supply light in a predetermined wavelength band corresponding to special light observation. In the special light observation, for example, so-called narrow band imaging is performed in which images of a predetermined tissue such as a blood vessel of the mucosal surface layer are captured with high contrast by irradiating the tissue with a narrower band of light than the irradiation light (that is, white light) used for normal observation by using the wavelength dependence of light absorption in body tissues. Alternatively, in the special light observation, fluorescence observation may be performed in which an image is obtained from fluorescence generated by irradiation with excitation light. In the fluorescence observation, a body tissue can be irradiated with excitation light to observe the fluorescence from the body tissue (autofluorescence observation), or a reagent such as indocyanine green (ICG) can be locally injected into a body tissue and then the body tissue can be irradiated with excitation light corresponding to the fluorescence wavelength of the reagent to obtain a fluorescence image. The light source device 11203 can be configured to be able to supply narrow band light and/or excitation light corresponding to such special light observation.

Figure 11:
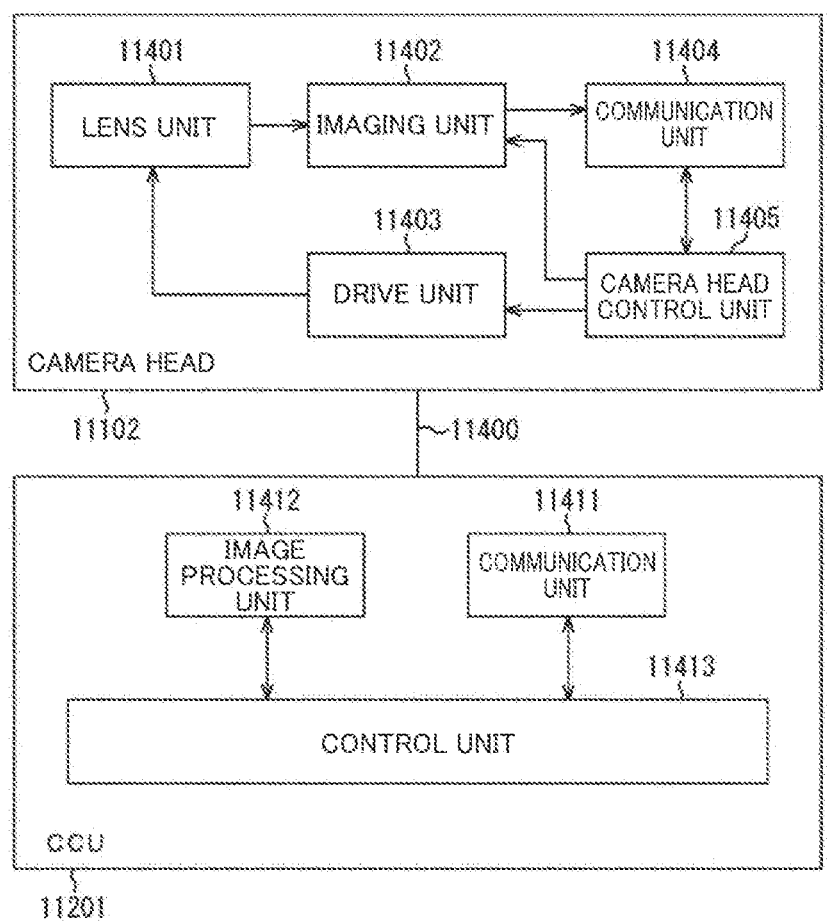
FIG. 11 is a block diagram of an exemplary functional configuration of a camera head and a CCU.

FIG. 11 is a block diagram showing an example of functional configurations of the camera head 11102 and the CCU 11201 shown in FIG. 10.

The camera head 11102 includes a lens unit 11401, an imaging unit 11402, a drive unit 11403, a communication unit 11404, and a camera head control unit 11405. The CCU 11201 has a communication unit 11411, an image processing unit 11412, and a control unit 11413. The camera head 11102 and the CCU 11201 are communicatively connected to each other by a transmission cable 11400.

The lens unit 11401 is an optical system provided in a connection portion for connection to the lens barrel 11101. Observation light taken from a tip of the lens barrel 11101 is guided to the camera head 11102 and is incident on the lens unit 11401. The lens unit 11401 is configured in combination of a plurality of lenses including a zoom lens and a focus lens.

The imaging element that constitutes the imaging unit 11402 may be configured of a single imaging element constituting (so-called single-plate type) or a plurality of imaging elements (so-called multi-plate type). In the case where the imaging unit 11402 is configured as being of a multi-plate type, for example, image signals corresponding to RGB may be generated by the imaging elements and synthesized to obtain a color image. Alternatively, the imaging unit 11402 may be configured to have a pair of imaging elements to acquire right-eye and left eye image signals for 3D (dimensional) display. The performed 3D display allows the operator 11131 to more accurately ascertain a depth of a living tissue in the surgical site. When the imaging unit 11402 is configured in a multi-plate type, a plurality of systems of lens units 11401 may be provided in correspondence to the imaging elements.

The imaging unit 11402 need not necessarily be provided in the camera head 11102. For example, the imaging unit 11402 may be provided immediately after the objective lens inside of the lens barrel 11101.

The drive unit 11403 is configured by an actuator and the zoom lens and the focus lens of the lens unit 11401 are moved by a predetermined distance along an optical axis under the control of the camera head control unit 11405. Accordingly, the magnification and focus of the image captured by the imaging unit 11402 can be adjusted appropriately.

The communication unit 11404 is configured using a communication device for transmitting and receiving various types of information to and from the CCU 11201. The communication unit 11404 transmits the image signal obtained from the imaging unit 11402 as RAW data to the CCU 11201 via the transmission cable 11400.

The communication unit 11404 receives a control signal for controlling driving of the camera head 11102 from the CCU 11201 and supplies the camera head control unit 11405 with the control signal. The control signal includes, for example, information regarding imaging conditions such as information indicating designation of a frame rate of a captured image, information indicating designation of an exposure value at the time of imaging, and/or information indicating designation of a magnification and a focus of the captured image.

The above-mentioned imaging conditions such as the frame rate, exposure value, magnification, and focus may be appropriately designated by the user, or may be automatically set by the control unit 11413 of the CCU 11201 based on the acquired image signal. In the latter case, the endoscope 11100 is to be equipped with a so-called auto exposure (AE) function, auto focus (AF) function, and auto white balance (AWB) function.

The camera head control unit 11405 controls driving of the camera head 11102 on the basis of a control signal from the CCU 11201 received via the communication unit 11404.

The communication unit 11411 is constituted of a communication device that transmits and receives various kinds of information to and from the camera head 11102. The communication unit 11411 receives an image signal transmitted via the transmission cable 11400 from the camera head 11102.

Further, the communication unit 11411 transmits the control signal for controlling the driving of the camera head 11102 to the camera head 11102. The image signal or the control signal can be transmitted through electric communication, optical communication, or the like.

The image processing unit 11412 performs various types of image processing on the image signal that is the RAW data transmitted from the camera head 11102.

The control unit 11413 performs various kinds of control on imaging of a surgical site by the endoscope 11100, display of a captured image obtained through imaging of a surgical site, or the like. For example, the control unit 11413 generates a control signal for controlling driving of the camera head 11102.

In addition, the control unit 11413 causes the display device 11202 to display a captured image showing a surgical site or the like based on an image signal subjected to the image processing by the image processing unit 11412. In doing so, the control unit 11413 may recognize various objects in the captured image using various image recognition techniques. For example, the control unit 11413 can recognize a surgical instrument such as forceps, a specific biological site, bleeding, mist or the like at the time of use of the energized treatment tool 11112, or the like by detecting a shape, a color, or the like of an edge of an object included in the captured image. When the display device 11202 is caused to display a captured image, the control unit 11413 may superimpose various kinds of surgery support information on an image of the surgical site for display using a recognition result of the captured image. By displaying the surgery support information in a superimposed manner and presenting it to the operator 11131, a burden on the operator 11131 can be reduced, and the operator 11131 can reliably proceed with the surgery.

The transmission cable 11400 that connects the camera head 11102 and the CCU 11201 is an electrical signal cable compatible with communication of electrical signals, an optical fiber compatible with optical communication, or a composite cable of these.

Here, although wired communication is performed using the transmission cable 11400 in the illustrated example, communication between the camera head 11102 and the CCU 11201 may be performed wirelessly.

An example of the endoscopic surgery system to which the technology according to the present disclosure can be applied has been described above. The technology according to the present disclosure may be applied to the imaging unit 11402 of the camera head 11102 among the configurations described above. Specifically, the solid-state imaging device 1 to which the above-described embodiments are applied can be applied to the imaging unit 10402. By applying the technology according to the present disclosure to the imaging unit 10402, the image quality deterioration of a surgical site image obtained by the imaging unit 10402 can be suppressed, the S/N ratio can be improved, and a high dynamic range can be achieved, so that clearer surgical site images can be obtained, and the operator can surely observe the surgical site.

Here, although the endoscopic operation system has been described as an example, the technology according to the present disclosure may be applied to other, for example, a microscopic operation system.

<Application to Mobile Object>

The technology of the present disclosure (the present technology) can be applied to various products. For example, the technology according to the present disclosure may be realized as a device mounted on any type of moving body such as an automobile, an electric automobile, a hybrid electric automobile, a motorcycle, a bicycle, a personal mobility device, an airplane, a drone, a ship, a robot, or the like.

Figure 12:
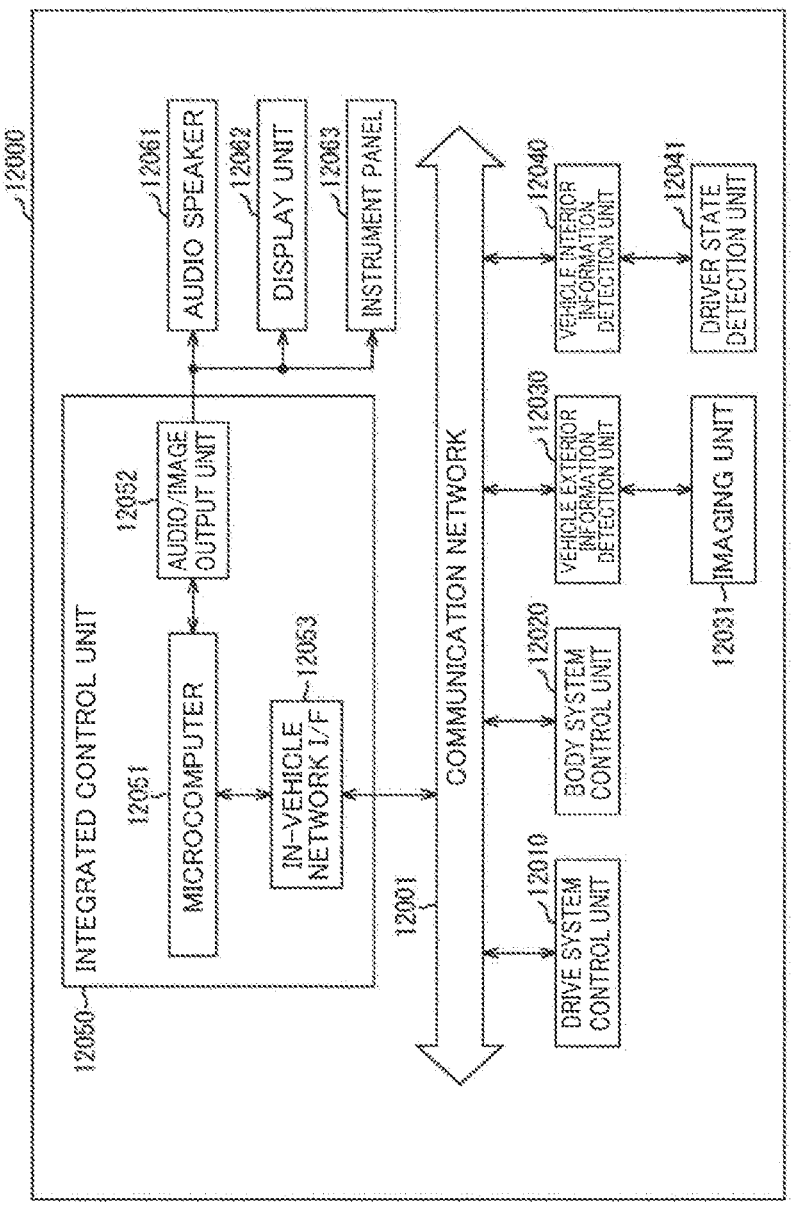
FIG. 12 is a block diagram of a schematic exemplary configuration of a vehicle control system.

FIG. 12 is a block diagram illustrating a schematic configuration example of a vehicle control system, which is an example of a moving body control system to which the technology according to the present disclosure can be applied.

The vehicle control system 12000 includes a plurality of electronic control units connected to each other via a communication network 12001. In the example illustrated in FIG. 12, the vehicle control system 12000 includes a drive system control unit 12010, a body system control unit 12020, a vehicle exterior information detection unit 12030, a vehicle interior information detection unit 12040, and an integrated control unit 12050. As a functional configuration of the integrated control unit 12050, a microcomputer 12051, an audio/image output unit 12052, and an in-vehicle network I/F (interface) 12053 are illustrated.

The drive system control unit 12010 controls an operation of a device related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle having the vehicle control system 12000 mounted thereon. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for peoples, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information inside and outside of the vehicle acquired by the vehicle exterior information detection unit 12030 or the vehicle interior information detection unit 12040, and output a control command to the drive system control unit 12010. For example, the microcomputer 12051 can perform cooperative control for the purpose of realizing functions of an ADAS (advanced driver assistance system) including vehicle collision avoidance, impact mitigation, following traveling based on an inter-vehicle distance, vehicle speed maintenance driving, vehicle collision warning, vehicle lane deviation warning, and the like.

Further, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12030 based on the information outside the vehicle acquired by the vehicle exterior information detection unit 12030. For example, the microcomputer 12051 can perform coordinated control for the purpose of antiglare such as switching a high beam to a low beam by controlling a headlamp according to a position of a preceding vehicle or an oncoming vehicle detected by the vehicle exterior information detection unit 12030.

The audio/image output unit 12052 transmits an output signal of at least one of sound and an image to an output device capable of visually or audibly notifying a passenger or the outside of the vehicle of information. In the example of FIG. 12, an audio speaker 12061, a display unit 12062, and an instrument panel 12063 are illustrated as examples of the output device. The display unit 12062 may include at least one of an on-board display and a head-up display, for example.

Figure 13:
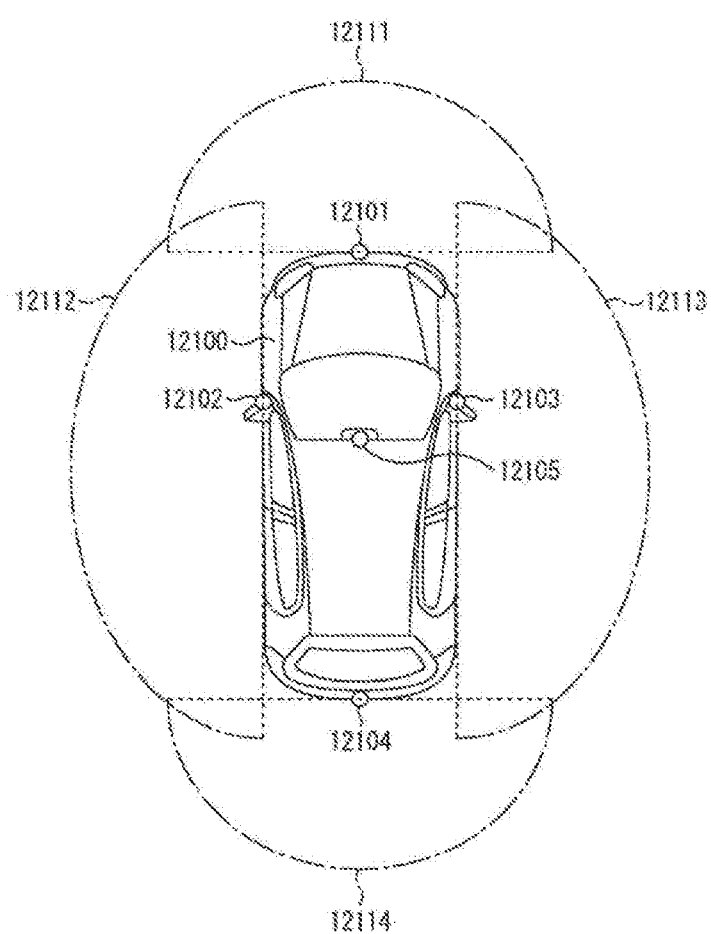
FIG. 13 is a view for illustrating an example of an installation position for a vehicle exterior information detection unit and an imaging unit.

FIG. 13 is a diagram showing an example of an installation position of the imaging unit 12031.

In FIG. 13, the imaging unit 12031 includes imaging units 12101, 12102, 12103, 12104, and 12105.

The imaging units 12101, 12102, 12103, 12104, and 12105 are provided at, for example, positions of a front nose, side mirrors, a rear bumper, a back door, an upper portion of a vehicle internal front windshield, and the like of the vehicle 12100. The imaging unit 12101 provided on a front nose and the imaging unit 12105 provided in an upper portion of the vehicle internal front windshield mainly acquire images in front of the vehicle 12100. The imaging units 12102 and 12103 provided in the side mirrors mainly acquire images on the lateral sides of the vehicle 12100. The imaging unit 12104 included in the rear bumper or the back door mainly acquires an image of an area behind the vehicle 12100. The imaging unit 12105 included in the upper portion of the windshield inside the vehicle is mainly used for detection of a preceding vehicle, a pedestrian, an obstacle, a traffic signal, a traffic sign, a lane, or the like.

FIG. 13 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path on which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and a temporal change in the distance (a relative speed with respect to the vehicle 12100) on the basis of distance information obtained from the imaging units 12101 to 12104. Further, the microcomputer 12051 can set an inter-vehicle distance to be secured in advance in front of a preceding vehicle and can perform automated brake control (also including following stop control) or automated acceleration control (also including following start control). Thus, it is possible to perform cooperative control for the purpose of, for example, automated driving in which the vehicle travels in an autonomous manner without requiring the driver to perform operations.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio/image output unit 12052 controls the display unit 12062 so that a square contour line for emphasis is superimposed and displayed with the recognized pedestrian. In addition, the audio/image output unit 12052 may control the display unit 12062 so that an icon indicating a pedestrian or the like is displayed at a desired position.

An example of the vehicle control system to which the technology according to the present disclosure can be applied has been described above. The technology according to the present disclosure may be applied for example to the imaging units 12031, 12101, 12102, 12103, 12104, and

12105 and the driver state detection unit 12041 among the above-described configurations. Specifically, the solid-state imaging device 1 in FIG. 1 having the imaging device according to the present disclosure can be applied for example to the imaging units and the detection unit. Then, by applying the technology according to the present disclosure, noise can be reduced, and safer vehicle traveling can be realized.

The present technology can also take on the following configurations.

(1) A solid-state imaging device including a photoelectric conversion unit that generates charge corresponding to an amount of received light,
   a transfer unit that transfers the charge generated by the photoelectric conversion unit,
   a charge storage unit that stores the charge transferred by the transfer unit,
   an amplifying transistor that amplifies a signal corresponding to the charge stored in the charge storage unit, and
   an isolation portion that isolates the photoelectric conversion unit,
   wherein
   the amplifying transistor has a gate electrode including two vertical gate electrode portions provided in a depth-wise direction from a first surface of a semiconductor layer to sandwich a channel region therebetween,
   the isolation portion includes at least a first isolation portion provided in a first groove provided in the depth-wise direction from the first surface, and
   an insulating layer provided on a side of one of the two vertical gate electrode portions opposite to the channel region is provided to overlap at least a part of the first isolation portion when viewed in the depth-wise direction.

(2) The solid-state imaging device according to (1), wherein the first groove penetrates the semiconductor layer from the first surface to a second surface opposite the first surface.

(3) The solid-state imaging device according to (1) or (2), wherein the insulating layer is provided closer to the first surface in the first groove.

(4) The solid-state imaging device according to any one of (1) to (3), wherein an impurity layer provided to cover the first isolation portion and having a conductivity type opposite to the conductivity type of the photoelectric conversion unit is formed through the first groove.

(5) The solid-state imaging device according to any one of (1) to (4), wherein an impurity layer provided to cover the first isolation portion and having a conductivity type opposite to the conductivity type of the photoelectric conversion unit is formed by solid phase diffusion or plasma doping.

(6) The solid-state imaging device according to any one of (1) to (5), wherein the channel region has a fin shape.

(7) The solid-state imaging device according to any one of (1) to (6), wherein the isolation portion further includes a second isolation portion provided in a second groove for a prescribed depth from a second surface on a side opposite to the first surface.

(8) The solid-state imaging device according to (7), wherein the gate electrode of the amplifying transistor is provided not to overlap the second isolation portion when viewed in the depth-wise direction.

(9) The solid-state imaging device according to (7) or (8), wherein the gate electrode of the amplifying transistor is shared by a plurality of the photoelectric conversion units and provided in a pixel region including the photoelectric conversion unit that photoelectrically converts blue wavelength light.

(10) The solid-state imaging device according to any one of (7) to (9), wherein the second isolation portion is provided at least a prescribed distance apart from the two vertical gate electrode portions when viewed in the depth-wise direction.

(11) The solid-state imaging device according to any one of (7) to (10), wherein the isolation portion including the first and second isolation portions is provided to surround an outer periphery of the photoelectric conversion unit in a substantially rectangular shape when viewed in the depth-wise direction,
   a first side of the substantially rectangular shape that overlaps the insulating layer when viewed in the depth-wise direction is the first isolation portion, and
   of second and third sides of the substantially rectangular shape that are in contact with the first side when viewed in the depth-wise direction, the side closer to the first side is the first isolation portion.

(12) The solid-state imaging device according to any one of (7) to (11), wherein the charge storage unit is provided to overlap the second isolation portion when viewed in the depth-wise direction and shared by a plurality of the photoelectric conversion units.

(13) The solid-state imaging device according to any one of (1) to (6), wherein the first isolation portion is provided to surround an outer periphery of the photoelectric conversion unit when viewed in the depth-wise direction.

(14) The solid-state imaging device according to any one of (1) to (13), wherein the photoelectric conversion unit is provided in the semiconductor layer,
   the gate electrode of the amplifying transistor is provided to overlap at least a part of the photoelectric conversion unit when viewed in the depth-wise direction, and the transfer unit includes a vertical transfer gate provided in the depth-wise direction between the photoelectric conversion unit and the first surface.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

REFERENCE SIGNS LIST

1 Solid-state imaging device
3 Pixel
11 Semiconductor layer
141 Insulating layer
73 isolation portion
731 First isolation portion
731a Impurity layer
732 Second isolation portion
732a Impurity layer
AG Amplifying gate
AG1 First vertical gate electrode portion
AG2 Second vertical gate electrode portion
C Channel region
TG Transfer gate
Tr3 Amplifying transistor
F1 First surface
F2 Second surface FD Floating diffusion
PD Photodiode
S1 First side
S2 Second side
S3 Third side
T1 First groove
T2 Second groove
TG Transfer gate
VG Vertical transfer gate

The invention claimed is:

1. A solid-state imaging device, comprising:
a photoelectric conversion unit configured to generate a charge corresponding to an amount of received light;
a transfer unit configured to transfer the charge generated by the photoelectric conversion unit;
a charge storage unit configured to store the charge transferred by the transfer unit;
an amplifying transistor configured to amplify a signal corresponding to the charge stored in the charge storage unit; and
an isolation portion configured to isolate the photoelectric conversion unit,
wherein
the amplifying transistor has a gate electrode that includes two vertical gate electrode portions,
the two vertical gate electrode portions are in a depth-wise direction from a first surface of a semiconductor layer,
a channel region is between the two vertical gate electrode portions,
the isolation portion includes at least a first isolation portion provided in a first groove provided in the depth-wise direction from the first surface, and
an insulating layer provided on a side of one of the two vertical gate electrode portions opposite to the channel region is provided to overlap at least a part of the first isolation portion when viewed in the depth-wise direction.

2. The solid-state imaging device according to claim 1, wherein the first groove penetrates the semiconductor layer from the first surface to a second surface opposite the first surface.

3. The solid-state imaging device according to claim 1, wherein the insulating layer is provided closer to the first surface in the first groove.

4. The solid-state imaging device according to claim 1, wherein an impurity layer provided to cover the first isolation portion and having a conductivity type opposite to the conductivity type of the photoelectric conversion unit is formed through the first groove.

5. The solid-state imaging device according to claim 1, wherein an impurity layer provided to cover the first isolation portion and having a conductivity type opposite to the conductivity type of the photoelectric conversion unit is formed by one of solid phase diffusion or plasma doping.

6. The solid-state imaging device according to claim 1, wherein the channel region has a fin shape.

7. The solid-state imaging device according to claim 1, wherein the isolation portion further includes a second isolation portion provided in a second groove for a prescribed depth from a second surface on a side opposite to the first surface.

8. The solid-state imaging device according to claim 7, wherein the gate electrode of the amplifying transistor is arranged not to overlap the second isolation portion when viewed in the depth-wise direction.

9. The solid-state imaging device according to claim 7, wherein the gate electrode of the amplifying transistor is shared by a plurality of photoelectric conversion units,
the plurality of photoelectric conversion units includes the photoelectric conversion unit, and
the gate electrode of the amplifying transistor is in a pixel region that includes the photoelectric conversion unit that photoelectrically converts blue wavelength light.

10. The solid-state imaging device according to claim 7, wherein the second isolation portion is provided at least a prescribed distance apart from the two vertical gate electrode portions when viewed in the depth-wise direction.

11. The solid-state imaging device according to claim 7, wherein the isolation portion including the first and second isolation portions is provided to surround an outer periphery of the photoelectric conversion unit in a substantially rectangular shape when viewed in the depth-wise direction,
a first side of the substantially rectangular shape that overlaps the insulating layer when viewed in the depth-wise direction is the first isolation portion, and
a side, from one of a second side of the substantially rectangular shape and a third side of the substantially rectangular shape that is in contact with the first side when viewed in the depth-wise direction, that is closer to the first side is the first isolation portion.

12. The solid-state imaging device according to claim 7, wherein the charge storage unit is provided to overlap the second isolation portion when viewed in the depth-wise direction,
the change storage unit is shared by a plurality of photoelectric conversion units, and
the plurality of photoelectric units includes the photoelectric conversion unit.

13. The solid-state imaging device according to claim 1, wherein the first isolation portion is provided to surround an outer periphery of the photoelectric conversion unit when viewed in the depth-wise direction.

14. The solid-state imaging device according to claim 1, wherein the photoelectric conversion unit is provided in the semiconductor layer,
the gate electrode of the amplifying transistor is provided to overlap at least a part of the photoelectric conversion unit when viewed in the depth-wise direction, and
the transfer unit includes a vertical transfer gate provided in the depth-wise direction between the photoelectric conversion unit and the first surface.

* * * * *